H. A. INMAN.
ADJUSTABLE BOX MACHINE.
APPLICATION FILED JUNE 24, 1910.
1,067,253.
Patented July 15, 1913.
12 SHEETS—SHEET 4.
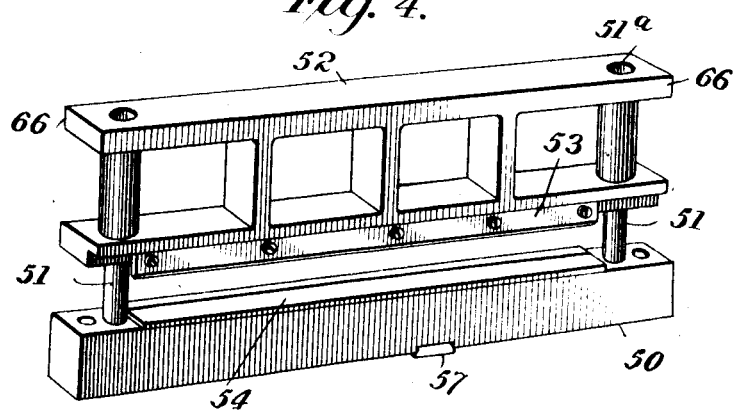
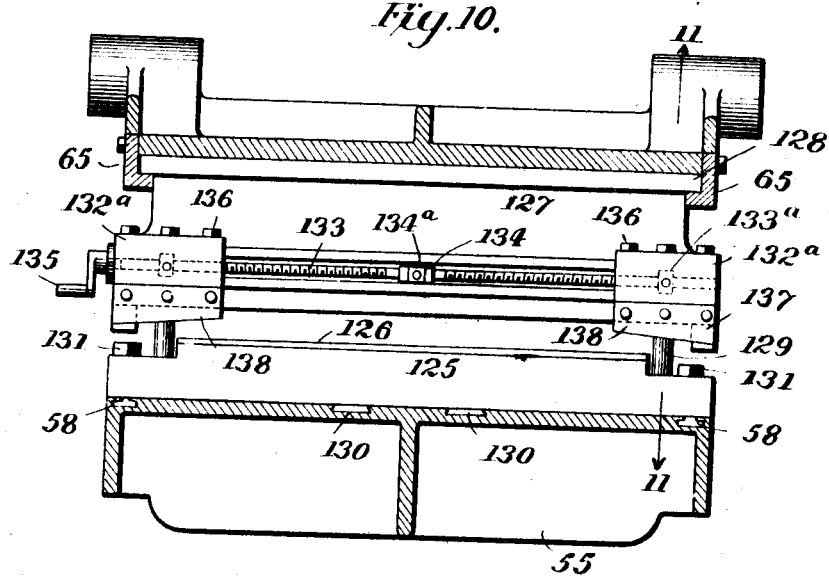
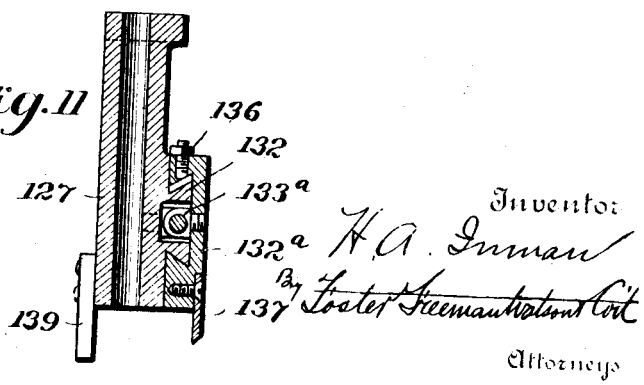

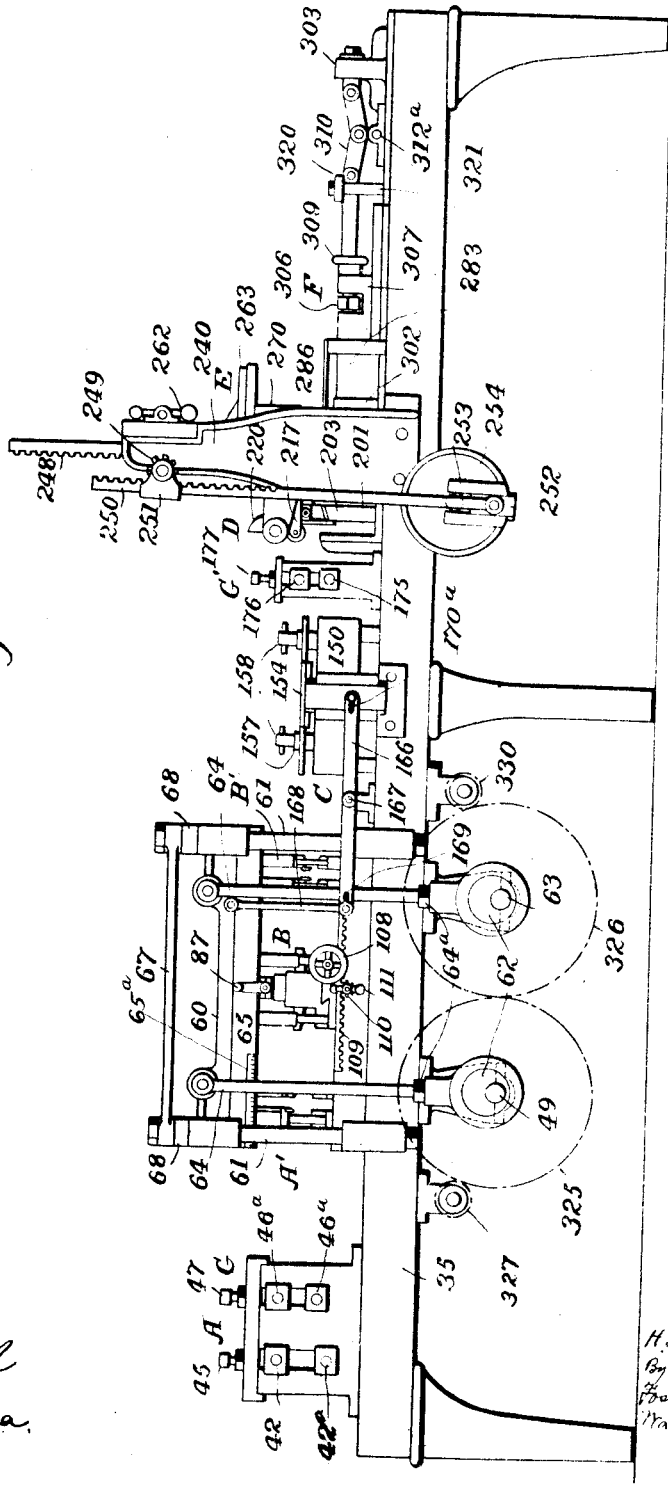

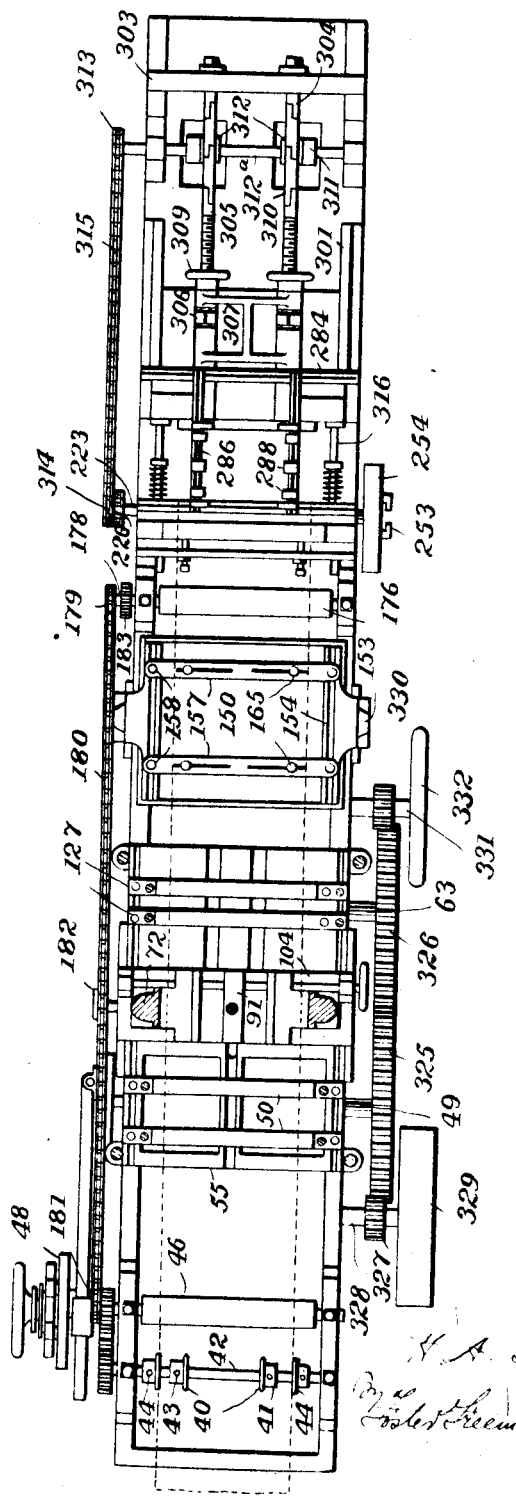

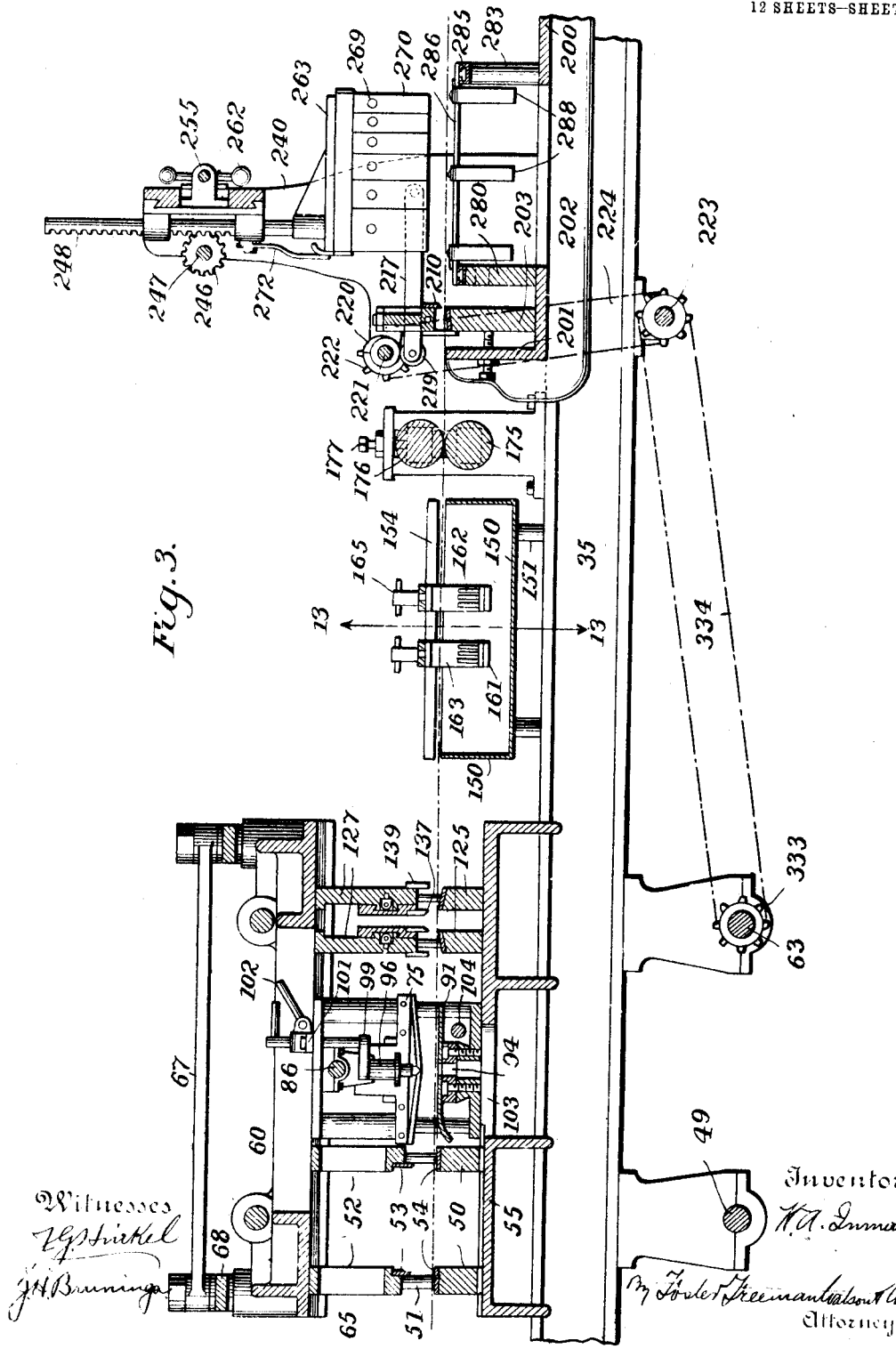

H. A. INMAN.
ADJUSTABLE BOX MACHINE.
APPLICATION FILED JUNE 24, 1910.

1,067,253.

Patented July 15, 1913.
12 SHEETS—SHEET 5.

H. A. INMAN.
ADJUSTABLE BOX MACHINE.
APPLICATION FILED JUNE 24, 1910.

1,067,253.

Patented July 15, 1913.
12 SHEETS—SHEET 6.

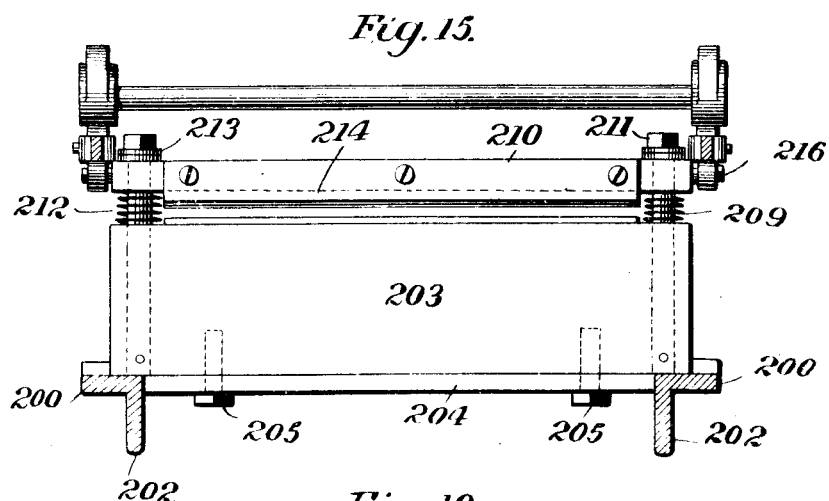
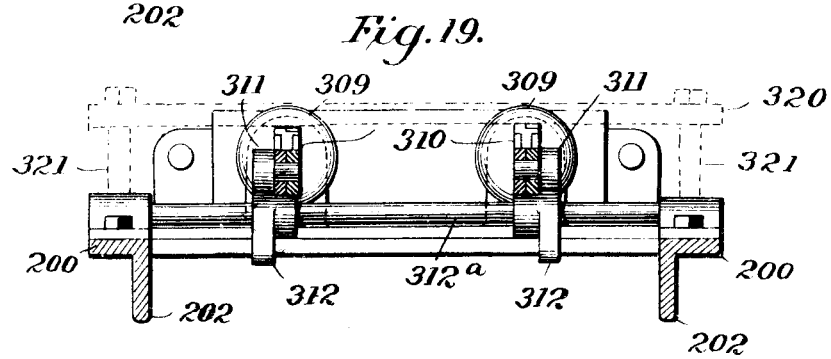
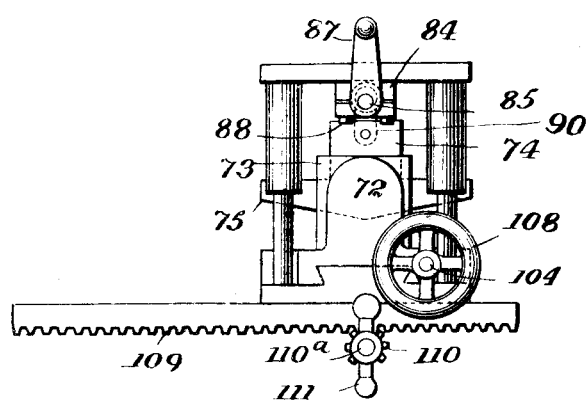

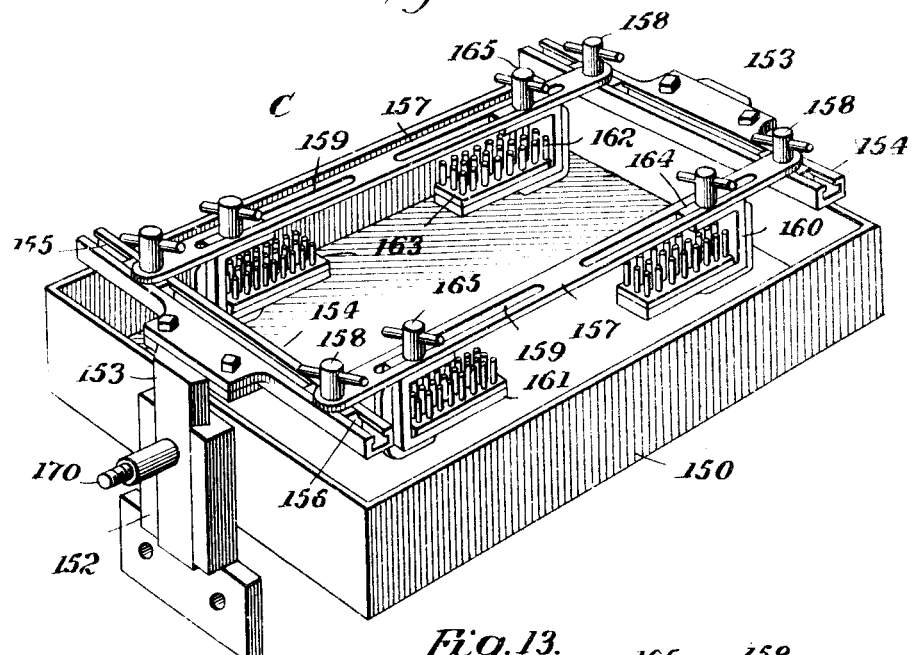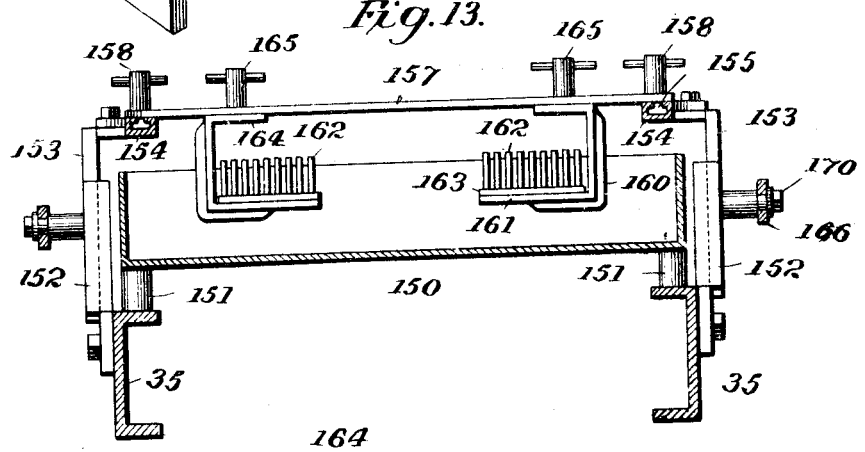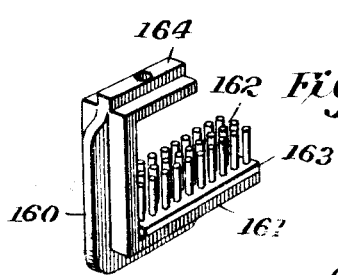

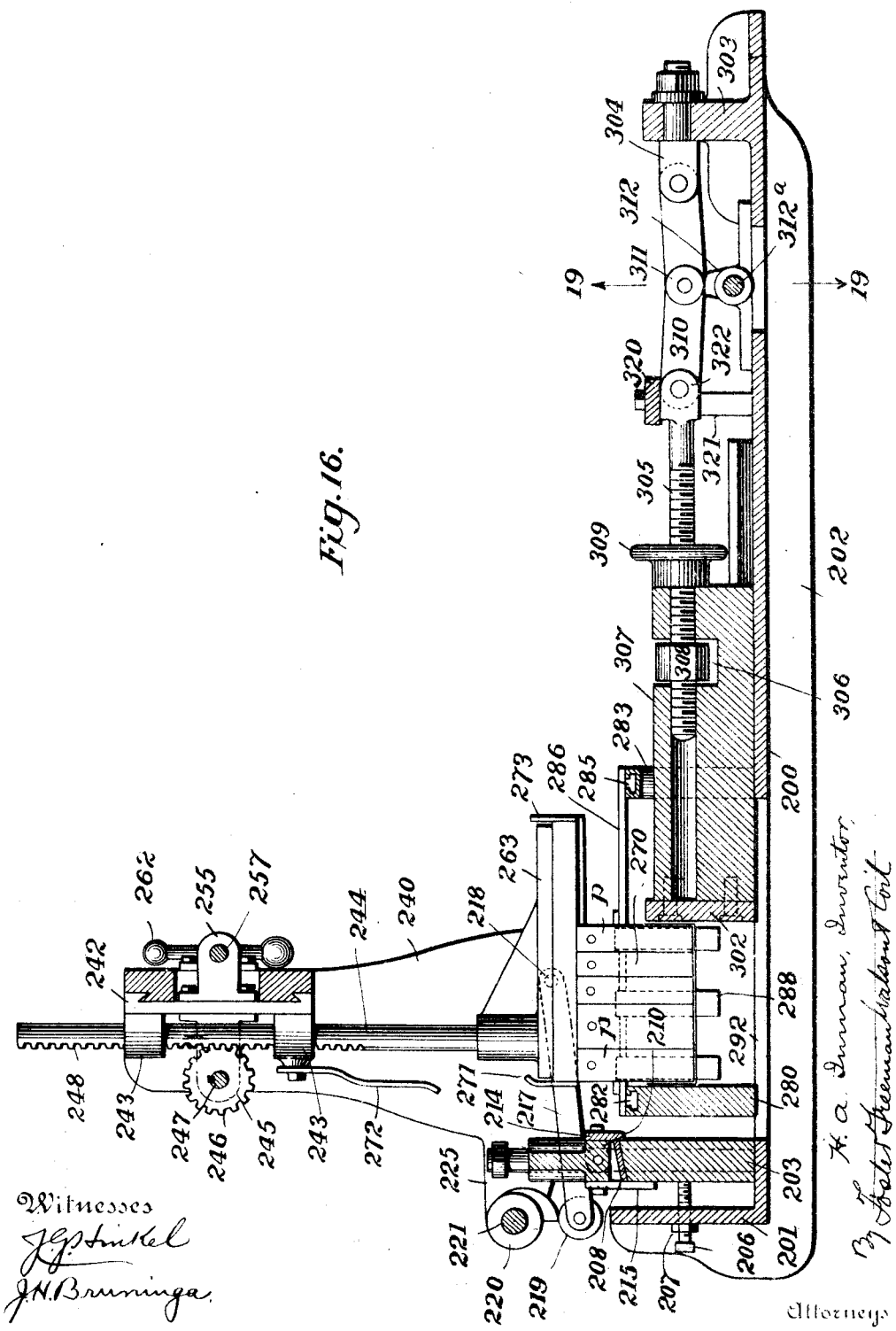

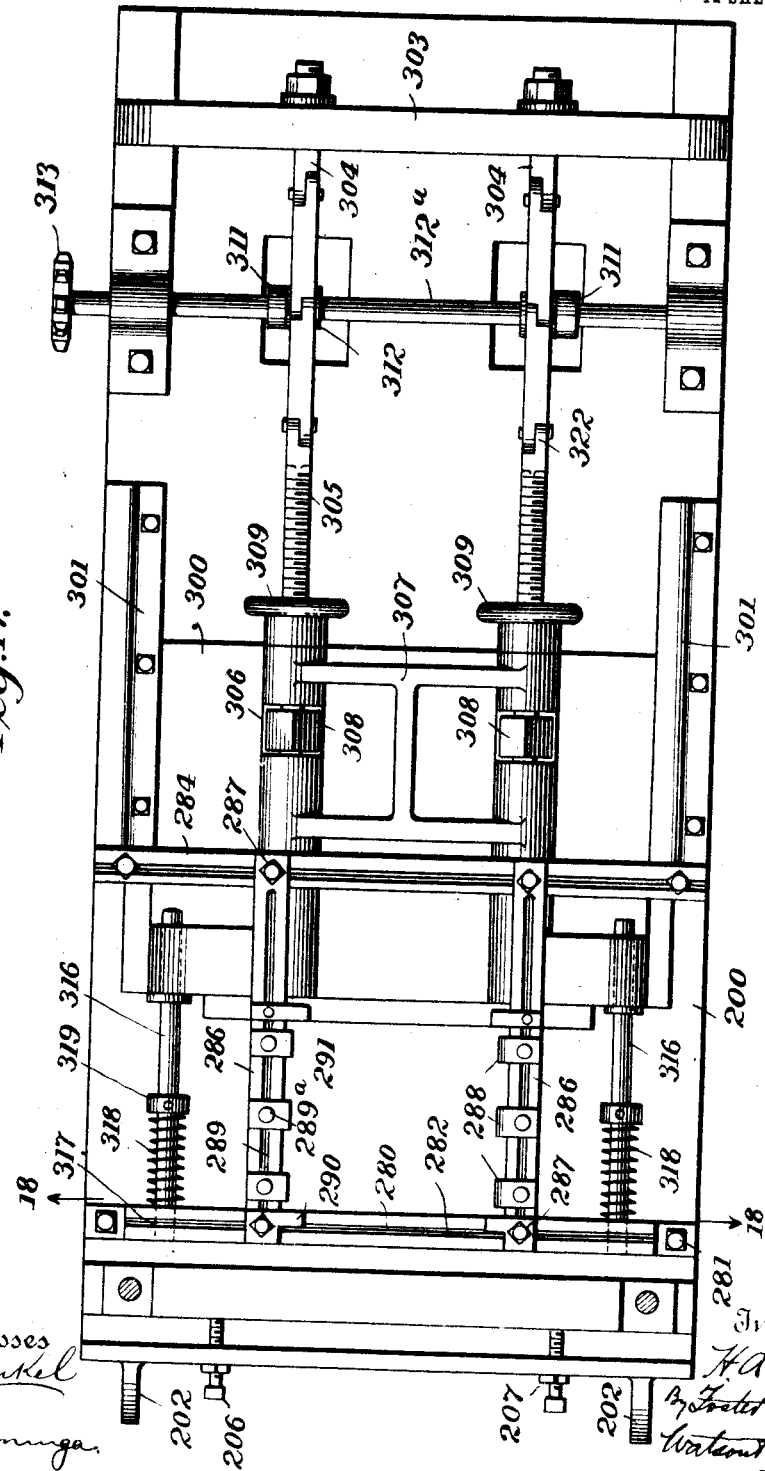

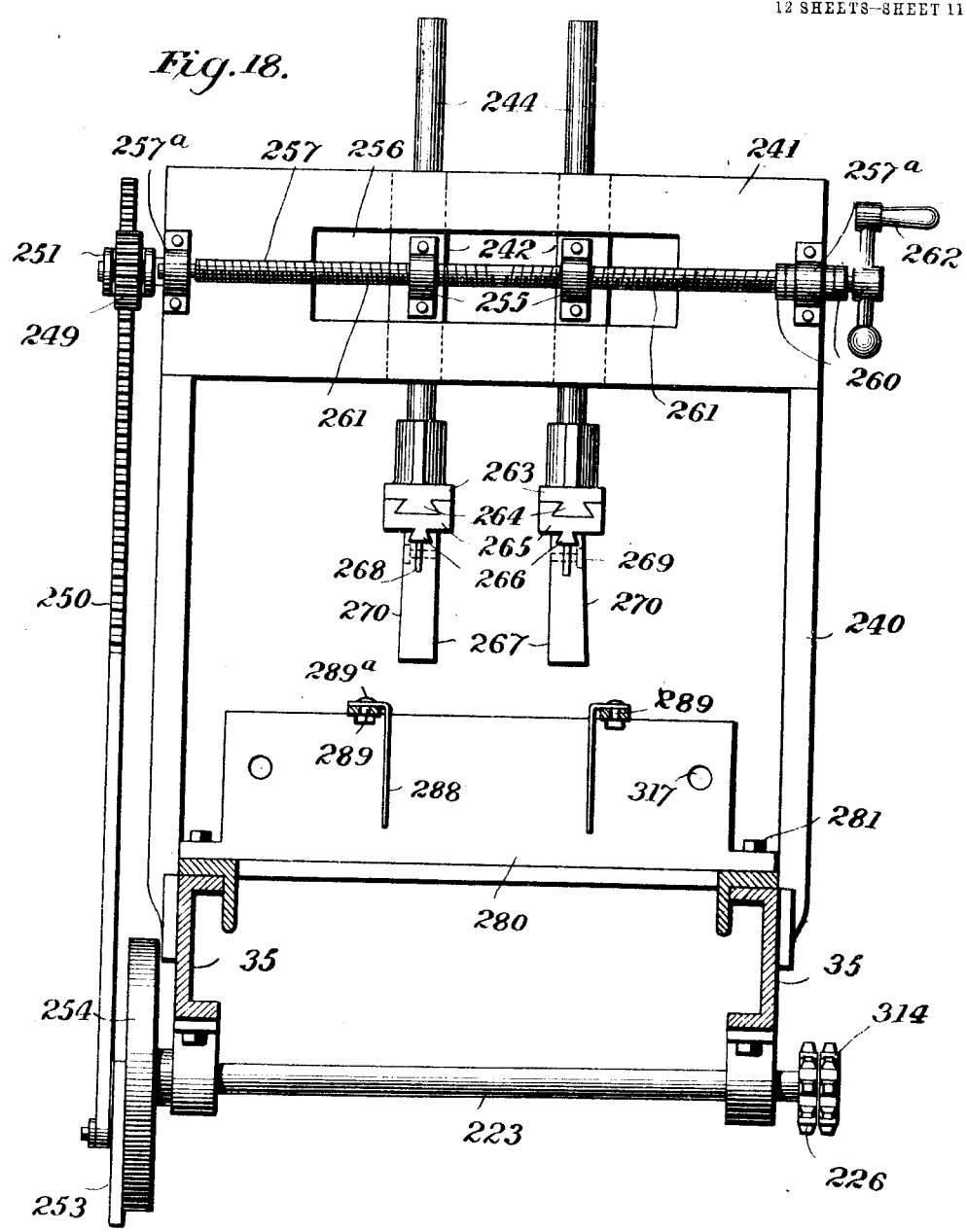

H. A. INMAN.
ADJUSTABLE BOX MACHINE.
APPLICATION FILED JUNE 24, 1910.
1,067,253.
Patented July 15, 1913.
12 SHEETS—SHEET 12.
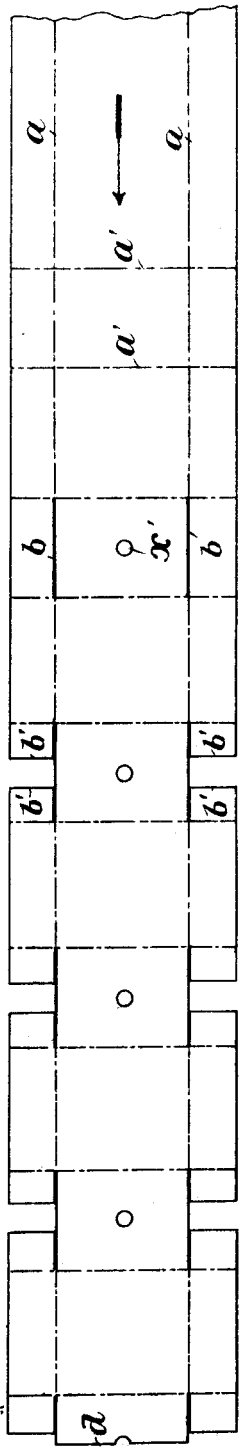
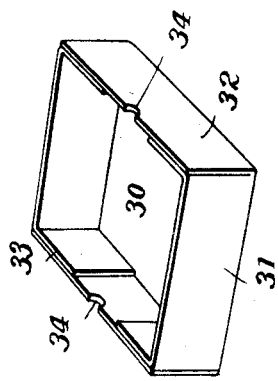
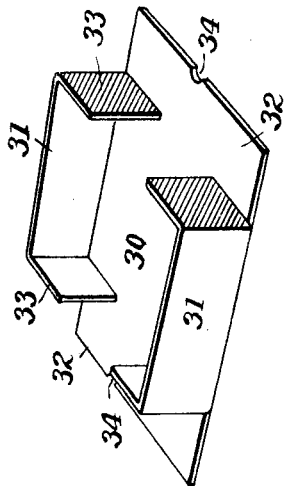

United States Patent Office.

HARRY A. INMAN, OF AMSTERDAM, NEW YORK.

ADJUSTABLE BOX-MACHINE.

1,067,253.  Specification of Letters Patent.  Patented July 15, 1913.

Application filed June 24, 1910. Serial No. 568,740.

*To all whom it may concern:*

Be it known that I, HARRY A. INMAN, a citizen of the United States, and resident of Amsterdam, county of Montgomery, State of New York, have invented certain new and useful Improvements in Adjustable Box-Machines, of which the following is a specification.

This invention relates to machines for making boxes of paper or like material.

One of the objects of this invention is to construct a machine which will take the material from the roll and form it into a completed box.

Another object is to construct the machine so that it may be adjusted to boxes of different sizes.

Another object is to construct a machine that will be simple in construction and operation, and so arranged that all parts will be accessible for adjustment and repairs.

Another object is to construct and arrange the elements or component parts so that they can be easily adjusted.

Another object is to improve and simplify the machine as to details.

Further objects will appear from the detailed description.

The invention will be described in connection with the accompanying drawings, in which—

Figure 5:
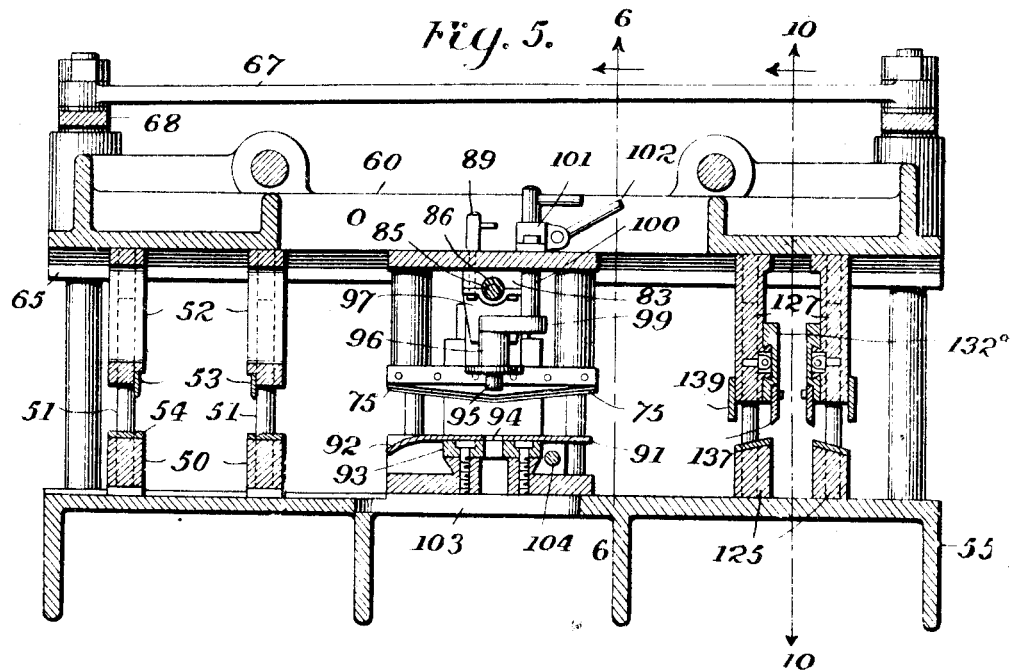
Figure 6:
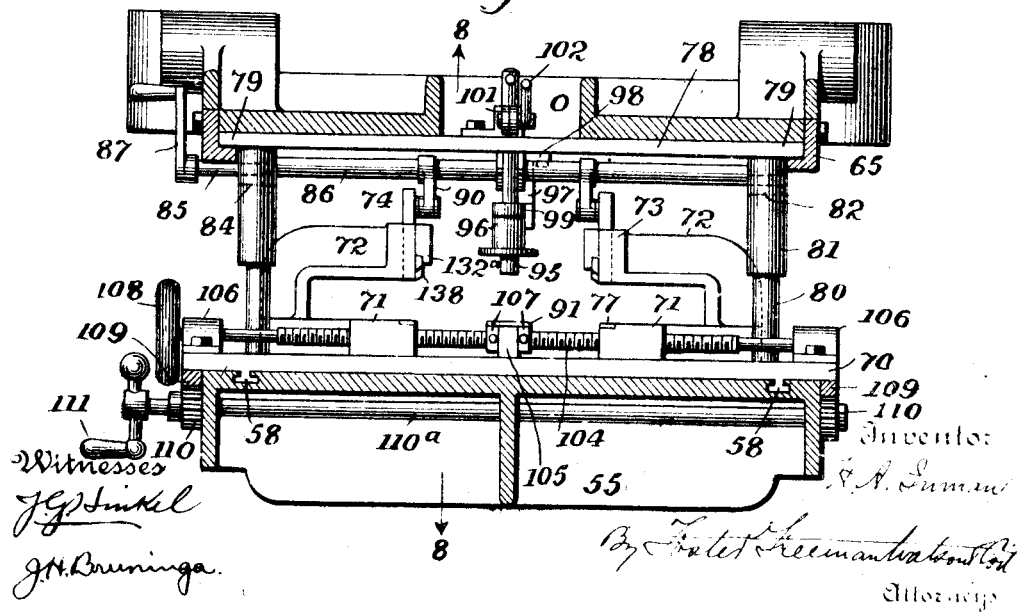
Figure 7:
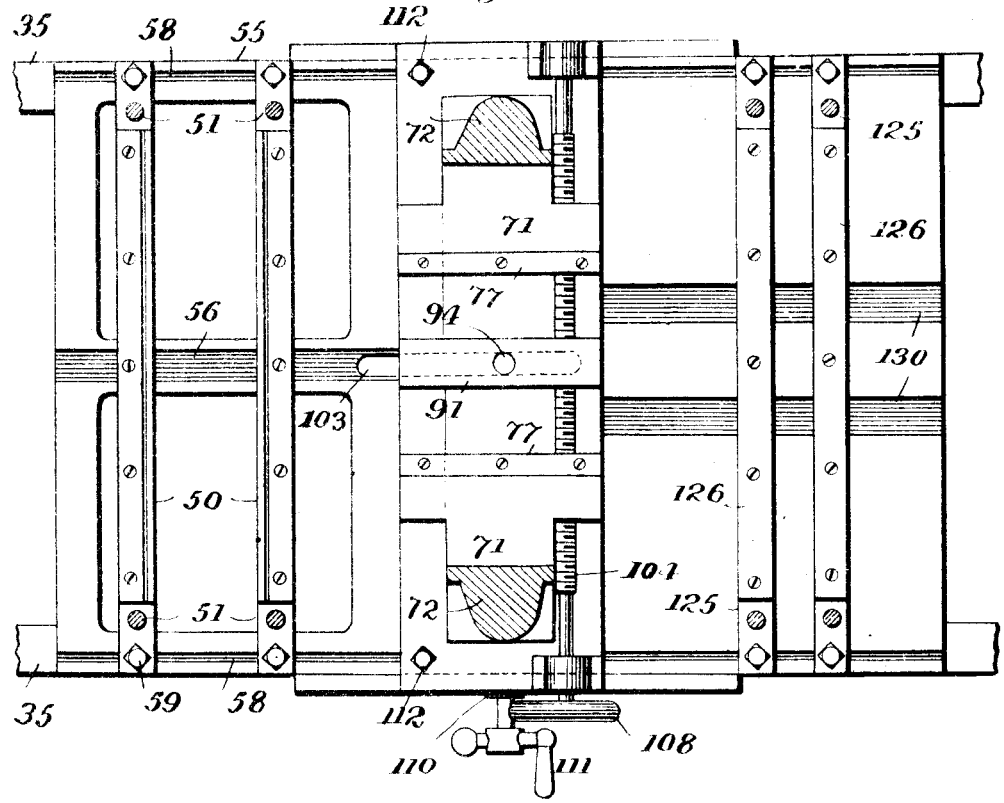
Figure 8:
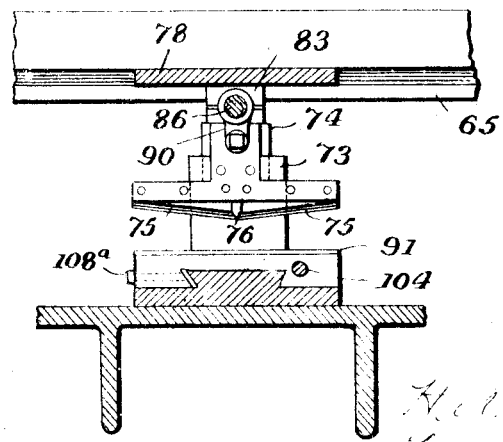

Figure 1 is a side elevation of the machine; Fig. 2 is a plan view in which some of the parts which are located above the paper line have been omitted; Fig. 3 is a section along the longitudinal center line of the machine, parts of the mechanisms being omitted; Fig. 4 is a perspective view of the cross scoring mechanism; Fig. 5 is a sectional view of a part of the mechanisms on an enlarged scale; Fig. 6 is a section on the line 6—6 Fig. 5; Fig. 7 is a section on the paper line of the mechanism shown in Fig. 5; Fig. 8 is a section on the line 8—8 Fig. 6; Fig. 9 is a side elevation of the mechanism shown in Fig. 6; Fig. 10 is a section on the line 10—10 Fig. 5; Fig. 11 is a section on the line 11—11 Fig. 10; Fig. 12 is a perspective view of the pasting mechanism; Fig. 13 is a sectional view of a pasting mechanism on the line 13—13 Fig. 3; Fig. 14 is a perspective view of one of the pasting members; Fig. 15 is a front elevation of the cutoff mechanism, parts of the mechanism and machine frame being shown in section; Fig. 16 is a section along the longitudinal center line of the machine, showing the cutoff, forming and presser mechanisms; Fig. 17 is a plan view of the mechanism shown in Fig. 16, the parts above the paper line being omitted; Fig. 18 is a section view on the line 18—18 Fig. 17, parts of the mechanism being shown in elevation; Fig. 19 is a section on the line 19—19 Fig. 16; Fig. 20 is a plan view of the web of material showing its condition as it is operated upon by the different mechanisms; Fig. 21 is a perspective view of the box partly assembled; and Fig. 22 is a perspective view of the assembled box.

Referring to Figs. 21 and 22 the box comprises a body member 30 having side flaps 31, end flaps 32 and corner flaps 33. The end flaps are provided with the usual finger holds or recesses 34.

The machine, generally speaking, comprises scoring mechanism A, cross scoring mechanism A', dieing mechanism B, B', pasting mechanism C, cutoff mechanism D, forming mechanism E and presser mechanism F. The web of material is drawn from a roll through suitable tension devices by means of feeding rolls G. An auxiliary pair of feeding rolls G' are also provided to feed the material through the machine. The roll support and the feeding rolls G are of substantially the same construction as shown in patent to Inman #657,418, September 4, 1900.

The separate mechanisms will be described in detail, and then the operation of the entire machine will be explained.

*The scoring mechanism.*—The longitudinal scoring mechanism is of substantially the form shown in the patent referred to. It comprises a pair of circular scoring knives or disks 40 provided with hubs or collars 41 and adjustably mounted upon a shaft 42, the scoring knives being secured in adjusted position by means of set screws 43. The shaft 42 has also mounted thereon trimmer knives 44 which may be secured in adjusted position by means of similar set screws. The shaft 42$^a$ is provided with adjustable collars having recesses therein, which coöperate with the knives 40. The shaft 42$^a$ is also provided with knives coöperating with the knives 44. The feeding mechanism G comprises upper and lower feeding rolls 46 mounted upon shafts 46$^a$. The shafts 42 and $46^a$ may be adjusted by means of set screws 45 and 47 respectively. The shafts 42 and 47 and $46^a$ have mounted thereon spur gears, and a step by step movement is imparted from the shaft 49 by means of the mechanism designated 48. This mechanism comprises suitable pawl and ratchet mechanism, and is fully shown and described in the application of Horace Inman, Serial No. 296,305, filed January 16, 1906. It is not necessary that this mechanism be of the specific type shown in the application referred to, since any mechanism whereby a step by step movement may be imparted to the shafts 42 and $46^a$ from the shaft 49 will accomplish the purpose.

The cross scoring mechanism comprises a pair of bases 50 located crosswise of the machine. Since the elements of this mechanism are identical, only one will be described in detail. The base 50 has mounted thereon a pair of posts 51 which enter guideways $51^a$ in the tool carrier 52. The tool carrier has mounted thereon a scoring knife 53 which engages a coöperating scoring die 54 on the base. A bed 55 is mounted upon and between the side members 35 of the frame, and is provided with a slideway 56 extending longitudinally of the machine. The base 50 is provided with a gib 57 which engages the slideway 56. The bed has also formed therein T-shaped slots or guideways 58, and the bases are provided with coöperating T-shaped gibs into which are screwed clamping bolts 59. An operating head 60 is provided with guideways so as to slide upon vertical posts 61 secured to the bed. A pair of eccentrics 62 are mounted upon the shafts 49 and 63 and engage eccentric straps secured to connecting rods 64 pivotally connected to the operating head 60. The eccentrics are duplicated on the opposite side of the machine. The tool carrier is provided with extensions 66, and the operating head has bolted thereto side straps 65. These side straps form a guideway in which the carriers 52 are arranged to slide longitudinally of the machine. The posts 61 are braced at their upper end by means of cross bars 67 and 68. The operation of the cross scoring mechanism will be obvious. After the material is moved to position the operating head 60 is reciprocated by means of the eccentrics so as to cause the tool carrier 52 to move downwardly and the knife 53 to coöperate with the die 54. The distance between the cross scores $b'$ $b'$ may be adjusted by moving the elements of the cross scoring mechanism longitudinally of the machine. After these elements are in position they may be clamped by means of the bolts 59.

In the specific construction shown the elements of the cross scoring mechanism are moved to adjusted position longitudinally of the machine by hand. It is obvious, however, that these elements may be adjusted as shown in the patent to Inman referred to. The vertical position of the cross scoring knives may be adjusted, by adjusting the length of the connecting rods 64. To accomplish this the lower ends of the rods are screwed into the eccentric straps and secured in adjusted position by means of the lock nuts $64^a$.

*The dicing mechanism.*—The dicing mechanism comprises slitting mechanism B and cross punching mechanism, or the mechanism for punching pieces from the flaps and designated B'.

*The slitting mechanism.*—A base 70 is mounted so as to slide longitudinally on the bed 55. The base has formed thereon a slideway on which move a pair of slides 71. Since the slides are of identical construction, only one will be described in detail. An overhanging arm 72 is formed upon or secured to the slide 71, and is provided with a guide or slideway 73 of dovetailed construction in which moves a slide 74. This slide has screwed or bolted thereto a knife comprising members 75. The knife members are of such a construction that the edge tapers down to a point 76, which point is located on the center line of the slideway on the base 70. It will thus be seen that the knife edges incline upwardly from the point 76. The base of the slide 71 is provided with a die 77 which coöperates with the knife 75.

A carrier 78 is provided with extensions 79 which engage the straps 65. The base 70 has mounted thereon posts 80 which coöperate with guideways formed in downwardly projecting lugs 81 secured to the carrier 78. The carrier 78 has secured thereto three bearings 82, 83 and 84 for a shaft or bar 85. This shaft is provided with an eccentric portion 86 and an operating handle 87. The bearings are provided with caps, and bolts 88 connect these caps to the bodies of the bearings. In order to clamp the shaft or bar 85 in adjusted position, the center bearing 83 is arranged to be clamped on the shaft by a bolt which extends through the cap and bearing body and the carrier 78 and is provided with a head or handle 89. The lower end of this bolt screws into the cap or into a nut. The operating head is cut away as shown at O so that the head 89 will be accessible. Links 90 connect the knife slides 74 with the shaft or bar 86, the connection between the links and the shaft or bar 86 being such as to permit the links to slide longitudinally with respect to the shaft or bar.

A die plate 91 is secured to the base 70 and located along the longitudinal center line of the machine. The die plate is curved downwardly at 92 so as to allow the paper to be fed thereover more readily. The die plate is secured to the base 70 by means of screws which pass through a base member 93. The die plate has formed therein a hole 94, which coöperates with a punch 95. This punch is braced and adjustably mounted in a guideway 96 secured to a bracket 97, which is bolted to the carrier 78 at 98. The punch 94 is secured to a cross member 99, which is mounted upon a bar 100 arranged for adjustment in a bearing 101 which is bolted to the upper face of the carrier 78. The bearing is a split bearing and may be clamped to secure bar 100 and punch 95 in position by means of a clamp 102. By means of the above construction the position of the punch may be adjusted vertically, and the support for this punch clears the shaft 85. This punch is arranged to punch holes $a'$ in the web so as to form the finger holds 34. The bed 55 is provided with a slot 103 so as to permit the punched out material to drop through.

A right and left screw 104 is mounted in bearings 105 and 106 and is restrained against endwise movement by collars 107. This screw has a threaded engagement with the slides 71 and has mounted upon one end a hand wheel 108. By rotating this hand wheel the slides may be adjusted toward and from each other crosswise of the machine. It will be noted that these slides will be adjusted uniformly toward and from the longitudinal center line of the machine. In order to provide additional means for securing the slides in adjusted position a set screw $108^a$ may be provided.

The base 70 is provided with gibs which engage the T slots 58 so that this base may be adjusted longitudinally of the machine. A pair of racks 109 are secured to this base and coöperate with spur gears 110 rigidly secured to the shaft $110^a$. This shaft has mounted upon it a handle 111 so that the base may be adjusted longitudinally of the machine by turning this handle. In order to secure the base in adjusted position on the bed 55 clamping bolts 112 are provided.

The slitting knives are arranged to cut longitudinal slits $b$ in the web. By adjusting the slides 71 toward and from each other crosswise of the machine the distance between these slits $b$ may be varied so as to adjust the machine for boxes of different widths. By adjusting the shaft or bar 86 through the medium of the handle 87 the vertical position of the knife may be varied. Now by varying the vertical position of the knife the length of the slit $b$ will be varied, since the knife edges incline upwardly. It will also be noted that since the inclination of the knives from the point 76 is the same the length of the slitted portion upon the opposite sides of the hole $a'$ is the same. It will thus be seen that by operating the handle 87 the length of the slits $b$ will be varied so as to adjust the slitting mechanism to boxes of different lengths. The base 70 as a whole may be adjusted longitudinally of the machine so as to adjust the slitting mechanism as a unit relatively to the other mechanisms.

*Cross punching mechanism or mechanism for punching pieces from the flaps.*—Where the height of the box is over one half its width, which latter dimension in this case is the dimension crosswise of the machine, it is necessary to punch out pieces from the corner flaps in order to prevent their overlapping. The mechanism for accomplishing this comprises a pair of bases 125 provided with dies 126. Since this mechanism comprises duplicate structures only one will be described in detail. A tool carrier 127 is provided with extensions 128 which coöperate with the straps 65. This tool carrier is provided with guideways which coöperate with vertical posts 129 mounted upon base 125. The bed 55 is provided with guideways 130 which coöperate with gibs on the base. Clamping bolts 131 screw into and engage gibs which slide in the T-shaped slots 58.

The carrier 127 is provided with a dovetailed slideway 132 which engages and carries a pair of slides $132^a$. A right and left screw 133 engages lugs $133^a$ in these slides and this screw is restrained against endwise movement by means of a pair of collars 134 engaging a bearing lug $134^a$ located at the center of the slideway. The screw 133 has mounted thereon a handle 135 so that by operating the handle the slides $132^a$ may be moved uniformly toward and from the center of the machine. The slides are clamped in adjusted position by means of set screws 136. A pair of knives 137 are mounted upon the slides and coöperate with the dies 126 on the bases. The cutting edges 138 of the knives are inclined so that they will operate with a draw cut. Additional guide and brace members 139 may be provided in order to brace the knife in its movements.

The knives and dies are arranged to cut the corner flaps on the lines $b'$, Fig. 20. By adjusting the bases 50 and the coöperating parts toward and from each other the distance apart of the lines $b'$ may be varied. In other words by adjusting the elements toward and from each other the mechanism is expanded so as to vary the length of the cut out pieces, the length being in this case taken as the dimension longitudinally of the machine. By adjusting the carriers $132^a$ toward and from each other the position of the knives with respect to the die is varied; and in this way the length of the cut crosswise of the machine is varied. In this way the width of the punched out piece is varied, the width being taken as the dimension crosswise of the machine.

It will be noted that the knives and dies 139 of one element are located reversely with respect to those of the other element. In this way the elements may be moved close together so that the length of the cut out portions may be made very small. In this specific construction the elements of the mechanism are adjusted longitudinally of the machine by hand. It is obvious, however, that these mechanisms may be adjusted in the same manner as the elements of the cross scoring mechanism in the patent to Inman referred to.

Not only may the elements of the mechanism be adjusted relatively to each other, but the mechanisms so far described may be adjusted relatively to each other as units. This is necessary in order to adjust the machine for boxes of different sizes.

Where, of course, the height of the box is less than one half its width then the cross punching mechanism can be dispensed with, and in such a case it can either be entirely removed from the machine, or the knife slides 132 can be moved outwardly until the knives will not engage the paper. The above invention, therefore provides a simple means for throwing the cross punching mechanism into and out of operation as required.

*The pasting mechanism.*—A paste receptacle 150 is supported on the side members 35 by means of vertical posts 151. The side members 35 have bolted thereto brackets 152 provided with dovetailed slideways in which move a pair of slides 153. These slides have bolted or otherwise secured thereto heads 154 which extend longitudinally of the machine and form a carrier for the pasting mechanism. The heads 154 have formed therein T-shaped slots or slideways 155. Blocks 156 move in these slideways and have secured thereto cross bars or members 157, the connection being made by means of clamps 158. These cross bars are provided with slots 159 and support the pasting members 160. The pasting members have formed thereon horizontally arranged arms 161 which support the pasting devices 162. These pasting devices comprise pins secured to plates 163, and these plates are secured to the arms 161 by means of screws so that they may be readily detached for cleaning or for repairs. The pasting members have formed thereon ribs 164 which engage the slots 159, and clamps 165 engage the pasting members to lock them in adjusted position on the cross bars 157.

A two armed lever 166 is pivoted upon a bracket 167 upon the side members 35, and is operatively connected to the head 60 by means of a link 168. The other arm of the lever is connected to a trunnion 170 on the slide 153, the lever being provided with a slot 170ª in order to permit free movement. In order that the vertical movement of the carrier may be adjusted the connection between the link 168 and the lever 166 is a pin and slot connection 169, the lower end of the link 168 being arranged to be clamped in adjusted position in the slot. The operative connection is duplicated on opposite sides of the machine.

The pastors are normally in their lowest position and dip into the paste in the receptacle 150. When the head 60 moves downwardly the carrier is moved upwardly to cause the pasting members to engage the flaps. The pasting members may be adjusted longitudinally of the machine by moving the cross bars 157 in the slideways 155, and they may be clamped in adjusted position by means of the clamps 158. Similarly the pasting members may be adjusted crosswise of the machine by moving them in the slots 159, and they may be clamped in adjusted position by means of the clamps 165. If desired 154 and 157 may be provided with scales. It will, therefore, be seen that this invention provides a construction in which the elements of the pasting members may be adjusted longitudinally and crosswise of the machine to adjust the pasting mechanism to boxes of different sizes. Similarly an adjustment longitudinally of the machine and relatively to the other mechanisms may also be obtained. It will be noted that the clamping members 158 and 165 are located above the web of material and above the paste receptacle so that these members will not be covered with paste, the entire construction providing a simple and accessible adjusting means.

*The feeding mechanism.*—A pair of feeding rolls 175 and 176 are mounted in brackets secured to the side members 35. These rolls are arranged to be adjusted by means of adjusting screws 177. The upper roll shaft 178 has mounted upon it a sprocket 179 which is driven by a chain 180 from a sprocket wheel 181 secured to the shaft of the step by step feeding mechanism 48. A suitable tensioning sprocket 182 may be provided to regulate the tension of the chain. The rolls 175 and 176 are geared together by means of suitable gears 183.

It will be seen that by means of the above construction the feeding mechanisms G and G' are driven in unison. The sprockets 179 and 181 are preferably so proportioned that the peripheral speed of the feed rolls 175 and 176 is slightly greater than that of the rolls 46. By means of this construction the web between the feeding mechanisms G and G' will be maintained taut. The same result may of course be accomplished by making the feed rolls of G' of slightly greater diameter than the feed rolls of G, the main object being to drive the feeding mechanisms in such a manner that the web between them will be maintained taut.

*The cutoff mechanism.*—A bed 200 is supported upon the side members 35. This bed has an angular upright portion 201 and is braced by means of ribs 202 extending along the bed and the portion 201. A base 203 is supported on the bed 200 and guided by means of a gib 204 secured to the base by means of bolts 205. Adjusting screws 206 are arranged to adjust the base 203 toward and from the upright portion 201 longitudinally of the machine. These adjusting screws are arranged to be locked in adjusted position by means of lock nuts 207. The base has mounted thereon vertical posts 209 which are arranged to guide a knife carrier 210. The posts are provided with heads 211 which limit the upward movement of the knife carrier, and springs 212 are mounted on these posts and interposed between the base and the knife carrier. Leather washers 213 are interposed between the heads 211 and the carrier, so as to deaden the shock due to the upward movement of the knife carrier under the impulse of the springs 212. The knife carrier is provided with a knife 214 which coöperates with a die 208 on the base. The base and the die are inclined as shown, so as to permit the web of material to pass over the same. The knife carrier has secured thereto additional braces or guides 215 which aid to brace and guide the carrier in its movements. The knife carrier has secured thereto anti-friction rolls 216, which engage the lower faces of arms 217 pivoted at 218 to the side members 240. The arms 217 have mounted thereon cam rolls 219 which are engaged by cams 220 upon a shaft 221. This shaft is mounted between rearwardly extending arms 225 of the side members 240, and has mounted upon it a sprocket 222 which is driven from the sprocket 226 on a shaft 223 by means of a chain 224.

The operation of the cutoff mechanism will be obvious from the description and the drawings.

The cams 220 will operate the knife carrier through the medium of the arms 217, the carrier being moved back by means of the springs 212. The cutoff mechanism as a whole may be adjusted longitudinally of the machine for boxes of different sizes. This cutoff mechanism is arranged to cut off the web on the line *d* Fig. 20. When the arms 217 are in their highest position, as shown in Fig. 3, the lower faces of the arms are horizontal, and therefore the base and knife carrier may be adjusted longitudinally of the machine without altering the relation of the knife and die.

*The forming mechanism.*—A pair of side members 240 are bolted to the frame side members 35 and are braced and connected at their upper ends by means of a cross member 241. This cross member is provided with a slideway, as shown in Fig. 16, and a pair of slides 242 are mounted upon this slideway so that they may be adjusted crosswise of the machine. Each of these slideways has mounted upon it a pair of spaced bearing lugs 243 which form a bearing for a vertical shaft or shank 244. Each of the slides is further provided with a pair of spaced bearing lugs 245, between which is mounted a gear 246. This gear is splined upon a shaft 247 mounted for rotation in the side members 240. The shank or bar 244 has formed thereon a rack 248 which meshes with the gear 246. The shaft 247 has rigidly secured to it a pinion 249 which meshes with rack teeth upon a rod or bar 250. This bar is guided by means of a guide member 251, which has spaced ears which embrace the pinion 249 and which is pivotally mounted on shaft 247, as shown in Figs. 1 and 18. The rod or bar is pivotally connected at its lower end to a slide 252 adjustably mounted in a slideway 253 upon a disk 254 which is rigidly secured to the shaft 223. By means of the above described train of mechanism the shaft 223 imparts a reciprocating movement to the shanks 244. The driving mechanism 250 to 254 inclusive may be duplicated on the opposite side of the machine if desirable.

Each of the slides 242 has secured to it a bearing member 255, which extends through an aperture 256 in the cross member. A shaft 257 is mounted in bearings 257ᵃ on the cross member and is restrained against endwise movement by means of collars 260. This shaft has right and left screw portions 261 which have threaded engagement with the bearing lugs 255. The shaft 257 is further provided with an operating handle 262 whereby the shaft may be rotated. By means of the above described construction the slides 242 may be simultaneously and uniformly adjusted crosswise of and toward and from the center of the machine. The splined connection between the shaft 247 and the gears 246 permit this movement of the slides without affecting the operative driving connection.

Each of the shanks 244 has secured thereto a head or carrier 263 which, as shown in Fig. 18, is provided with a dove-tailed slideway 264. A slide 265 is mounted upon this slideway so as to have a slight movement thereon longitudinally of the machine. The slide 265 has a dovetailed slideway 266 which is arranged to receive one or more detachable and interchangeable blocks 267. The upper portions of these blocks have longitudinal slits 268 and the blocks may be clamped to the slide by means of screws 269. The outside faces 270 of the blocks are tapered, as shown in Fig. 18, for a purpose hereinafter to be described. The rear ends of the slides 265 have cam fingers 271 secured thereto, which coöperate with cam fingers 272 secured to the bearing lugs 243 on the frame of the machine. The rearward movement of the slides are limited by upwardly extending plates 273. These plates are detached in Fig. 18 so as to show the other mechanism.

A rigid abutment 280 extends transversely of the machine and is mounted upon and secured to the bed 200 by means of bolts 281. This abutment is therefore located in a fixed position longitudinally of the frame. The upper face of this abutment has formed therein a T-shaped groove or slideway 282. Posts 283 are mounted on opposite sides of the machine and support a cross bar 284, which has formed therein a T-shaped groove or slideway 285 extending transversely of the machine and parallel to the slideway 282. A pair of side bars or members 286 span the rigid abutment and the cross bar 284, and are adjustably connected to this abutment and cross bar by means of bolts 287 engaging T-shaped gibs which slide in the slideways 282 and 285. By means of this construction the side bars 286 may be adjusted transversely of the machine. A plurality of yielding spring fingers 288 are mounted upon the side bars 286, the side bars being provided with slots 289 and clamping bolts 289ª extending through the spring fingers so that they may be clamped in adjustable position on the side bars. A pair of fingers 290 are secured in fixed position by means of bolts 287, and a second pair of fingers 291 are mounted upon the side bars 286 and arranged to be adjusted longitudinally thereon in the same manner as the spring fingers 288.

The mechanism thus described forms a die which coöperates with the plunger mechanism to form the box. The die may be adjusted to boxes of different widths by adjusting the side bars 286 transversely of the machine and for different lengths by adjusting the spring fingers 288 and the fingers 291 longitudinally of the machine. The plunger mechanism may be adjusted to boxes of different widths by adjusting the slides and plunger carriers toward and from each other transversely of the machine through the medium of the handle 262. The depth of the plunger may be adjusted for boxes of different lengths by adding or subtracting blocks 267. By proper combinations of blocks the plunger may be built up to suit any size box with a small number of blocks. The stroke of the plunger may be varied by adjusting the position of the slide 252 in the slideway 253.

*The presser mechanism.*—A carriage 300 is guided on the bed 200 by means of the guide members 301. This carriage has secured to it a face plate 302. A bearing member 303 is formed on the rear portion of the bed 200 and has secured to it lugs 304. Threaded shanks 305 extend through holes formed in bearings 307 of the carriage so that the shanks 305 can slide in said holes. The bearings are cut away as shown at 306 so as to provide space for adjusting nuts 308. Clamping nuts 309 are also mounted upon shanks 305. The shanks 305 are connected to the bearing lugs 304 by means of toggle links 310. These toggle links have mounted thereon cam rolls 311 which engage cams 312 upon a shaft 312ª extending transversely of the machine. This shaft has mounted upon it a sprocket 313 which is driven from a sprocket 314 upon shaft 223 by means of a chain 315.

The carriage has secured to it bars 316 which are guided in apertures 317 in the abutment 280, and coöperating holes may be formed in the base 203 of the cutoff mechanism. The bars have mounted thereon springs 318, which engage at one end the rigid abutment 280 and at the other end adjustable collars 319. A cross member 320 is supported from the bed 200 by means of posts 321 and the lower face of the cross member 320 engages the joints 322 so as to take up the upward thrust.

The carriage 300 is reciprocated in one direction by means of the cam 312 and in the opposite direction by means of the springs 318. In Fig. 1 the presser carriage 300 is shown in its rearward position, while in Fig. 16 it is shown in its forward position. It is of course necessary that the toggles be still slightly broken when in the position shown in Fig. 16, so that the springs 318 may throw them to the position shown in Fig. 1. The position of the presser carriage 300 longitudinally of the machine may be adjusted by means of the adjusting nuts 308 so as to adjust the presser for boxes of different sizes, and the carriage may be clamped in adjusted position by means of the lock nuts 309.

The operation of the forming and pressing mechanisms will now be described.

As the web is fed underneath the plungers these plungers come down and the web is clamped between the plungers and the die. While in this clamped position the cutoff mechanism becomes operative to cut off the web on the line *d* Fig. 20. If desired the plungers may be driven by mechanism shown and described in the application of Horace Inman, Serial No. 296,306, filed January 16, 1906. After the web has been cut off on the line *d* the plungers move downwardly and the box is formed, the side flaps being engaged by the spring fingers 288 and the end flaps by the fingers 290, 291, and the rigid abutment 280. The fingers 290 and 291 will engage the corner flaps and will insure that these corner flaps are folded inwardly and inside of the end flaps 32.

As the plunger continues to move downwardly the presser carriage 300 will move forwardly and the forward end flap will be engaged by the face plate 302. It will be noted that when the plungers start to move downwardly the carriages 265 have been moved forwardly by the cams 272 during the previous upward movements of the plungers, so that the fingers 271 will be in engagement with the carriage 263. During the downward movement of the plungers the presser carriage 300 will move forwardly moving the blocks 267 and their carriages 265 with it, since there is a loose connection between the carriages 263 and the slides 265. When the plunger has arrived at its lowest position the box and the plunger blocks have been pressed against the rigid abutment 280. This insures that the box will be pressed together. When the plunger moves upwardly the box is retained between the spring fingers 288, the rigid abutment and the face plate 302. If desired spring fingers similar to those shown in the application referred to may be provided to prevent the box from moving upwardly with the plungers. When the next box is formed the formed box will be pushed downwardly through the opening 292 in the bed.

It will be noted that the outside faces 270 of the plungers are beveled. The function of this construction is to insure that the sides of the box will be square or at right angles to the bottom 30. If the sides of the plungers are at right angles to the bottom line, then it is impossible to press the upper portions of the sides tight enough against the plungers so that the box will be square. However, by properly beveling these sides even the yielding spring fingers will cause the box sides to be properly squared with respect to the box bottom.

It will be noted that the right and left screw 257 permits of a uniform movement of the plungers toward and from the center line of the machine. This is convenient since all mechanisms can be adjusted with respect to a longitudinal center line. In the specific construction shown the built up block arrangement of the plunger mechanism is shown as applied to a laterally expansible plunger comprising two plunger members. It is obvious, however, that these blocks 267 may extend entirely across the machine, so that there will be in effect a single plunger member.

The shafts 49 and 63 have mounted thereon intermeshing gears 325 and 326, the gear 325 meshing with a gear 327 upon a shaft 328. This shaft 328 forms the main driving shaft of the machine and has mounted upon it a main driving pulley 329, which may be clutched to or unclutched from the shaft 328 by means of a clutch of well known construction. A gear 330 meshing with a gear 326 is mounted upon a stub shaft 331 and has mounted upon it a hand wheel 332, so that the machine may be turned over by hand. The shaft 63 has mounted upon it a sprocket 333 and the shaft 223 has mounted upon it a sprocket which is connected to the sprocket 333 by means of a chain 334.

*Operation of the machine.*—The web of material is fed through the machine by means of the feeding mechanisms G and G'. The material is scored longitudinally on the lines $a$ by means of the longitudinal scoring mechanism A, and is simultaneously trimmed by means of the trimming knives 44. As the web is moved to position underneath the operating head 60 and comes to rest the head descends and the cross scores $a'$ are formed on the web by means of the cross scoring mechanism A'. The material is now fed to position underneath the slitting mechanism B which forms the slits $b$ upon the next downward movement of the operating head. The web is now fed underneath the cross punching mechanism B' which punches out pieces from the flaps along the lines $b'$ during the succeeding downward movement of the operating head. The web is now fed to the pasting mechanism C where the flaps are pasted. The web is then fed underneath the plungers. These plungers move down and engage the web so as to clamp the same while the cutoff mechanism cuts off the web on the line $d$. The plungers descend and in coöperation with the die and presser form and press the box. It will thus be seen that the mechanisms operate successively upon the material in the order named. The elements of the different mechanisms are adjustable to boxes of different sizes. The different mechanisms may be adjusted to boxes of different widths, lengths and heights. In no case is it necessary to substitute different dies, but the elements of the mechanisms themselves are adjustable. This is also true of the plunger mechanism in which the plungers are made up of combinations of different blocks. In no case is it necessary to keep different size plungers on hand, but a combination made up of a very few blocks properly proportioned will be sufficient for a very large number of sizes. In addition it is not necessary that the depth of the plunger be entirely built up, since it is only necessary to use the end blocks, for instance, in Fig. 16, these end blocks are designated $p$. By omitting the blocks between these end blocks these end blocks $p$ may be adjusted toward and from each other to vary the depth of the plunger.

The mechanisms are movable relatively to each other longitudinally of the machine, which is necessary where it is desired to change from one size box to another. It will be noted that one of the mechanisms is in a fixed position longitudinally of the machine and that the others are adjusted toward and from it. In this particular case the rigid abutment 280, which is a part of the forming mechanism and also of the presser, is in a fixed position longitudinally of the machine and the other mechanisms are adjustable toward and from it longitudinally of the machine. It is obvious, however, that any of the other mechanisms may be fixed in this manner and the others adjusted relatively to it. In order that the cross scores may be located a predetermined distance from the abutment 280, the head 65 is provided with a scale 65ᵃ and the carriers 52 are provided with pointers moving over the scale. The scale is provided with suitable graduations.

In order to adjust the machine for boxes of a certain size the procedure is as follows: The web of material is fed between the rollers 46 of the feeding mechanism G. The longitudinal scoring knives 40 are then adjusted so that the scoring lines $a$ will be a distance apart equal to the width of the box. The trimmers 44 are then adjusted so that they will be spaced from the scoring knives a distance equal to the height of the box. The web is now fed forward between the rollers 175 and 176 of the feeding mechanism G'. The feeding mechanisms G and G' are then operated so as to stretch the material taut between G and G'. The cross scoring mechanism A' is now adjusted so that the scoring lines $a'$ will be spaced apart a distance equal to twice the height of the box. The step by step feeding mechanism 48 is now adjusted so that the feed will be equal to the length of the box in the flat. The cross scores are also adjusted by scale 65ᵃ so that they will be the proper distance from the abutment 280, in order that the forward cross score $a'$ may subsequently aline with the forward edge of the abutment. The material is now fed forward one step or the length of the box and the slitting mechanism B is adjusted longitudinally of the machine by the handle 111 so that the points 76 of the slitting knives and the punch 95 will be located on a line midway between the lines $a'$, the position of the punch being designated by the reference character $x$ in Fig. 20. The slitting knives are now adjusted crosswise of the machine by means of the hand wheel 108 until they aline with the longitudinal scoring lines $a$. The slitting knives are now adjusted vertically by means of the handle 87 until the length of the slit is equal to twice the height of the box, or in other words, until the ends of the slits $b$ reach the cross scoring lines $a'$. The material is now fed forward another step and the cross punching mechanism B' is adjusted so as to punch out pieces from the flaps on the lines $b'$, the length of the cuts crosswise of the machine being adjusted by means of the handle 135. The material is now fed forward one or two steps and the pasting members of the pasting mechanism C are adjusted longitudinally and crosswise of the machine so that they will come into proper engagement with the corner flaps 33. The material is now fed forward one or more steps until the box blank is underneath the forming mechanism E, with the forward cross score line $a'$ in alinement with the forward edge of the abutment 280. The cutoff mechanism D is now adjusted so as to cut off the material on the line $d$ which is located midway between the cross score lines $a'$. The cross bars 286 are now adjusted crosswise of the machine so as to place the fingers 288 in proper alinement with the longitudinal scoring lines $a$. The fingers 288 and 291 are now adjusted longitudinally of the machine so that the rear edges of the fingers 291 will be on a line with the rear cross score lines $a'$. The plungers are now adjusted crosswise of the machine by means of the handle 262 until the faces 270 are located on the lines $a$. The plungers are then built up so as to be of a depth equal to the length of the box as measured between lines $a'$. The presser mechanism F is now adjusted to proper position by means of adjusting nuts 306 and locked in position by means of lock nuts 309. The machine is now ready for operation.

In the specification and claims the term "width", "length", and "height" are used. These terms are relative terms, and are used for convenience to designate the different dimensions of the box. In the specific construction shown the width may be taken as the dimension crosswise of the machine, and the length as longitudinally of the machine.

It is obvious that some of the features of this machine may be applied to machines which complete the blank, while other features may be applied to machines which form the blank into a box. Furthermore, certain adjustments may be used independently of others, and certain specific mechanisms may be used independently of other specific mechanisms.

It is further obvious that various changes may be made in the details of construction without departing from this invention, and it is, therefore, to be understood that this invention is not limited to the specific construction shown and described.

Having thus described the invention, what is claimed is:

1. In a box machine, the combination with means for feeding the material longitudinally of the machine, of scoring mechanism, longitudinal slitting mechanism and pasting mechanism, means for adjusting the elements of said mechanisms crosswise of the machine for boxes of different sizes, means for adjusting said mechanisms relatively to each other, and means for operating said mechanisms.

2. In a box machine, the combination with means for feeding the material longitudinally of the machine, of cross scoring mechanism, longitudinal slitting mechanism and pasting mechanism including pasting members, means for adjusting the elements of said cross scoring mechanism longitudinally of the machine, means for adjusting said slitting mechanism to adjust the length of the slits, means for adjusting said pasting members longitudinally of the machine, and means for operating said mechanisms.

3. In a box machine, the combination with means for feeding the material longitudinally of the machine, of longitudinal and cross scoring mechanisms, longitudinal slitting mechanism, mechanism for punching out pieces from the flaps, and pasting mechanism including pasting members, means for adjusting the elements of said mechanisms crosswise of the machine, means for adjusting the elements of said cross scoring mechanism longitudinally of the machine, means for adjusting said slitting mechanism to adjust the length of the slits, means for adjusting the pasting members longitudinally of the machine, and means for operating said mechanisms.

4. In a box machine, the combination with means for feeding the material longitudinally of the machine, of scoring mechanism, longitudinal slitting mechanism, mechanism for punching out pieces from the flaps, and pasting mechanism, means for adjusting the elements of said mechanisms crosswise of the machine for boxes of different sizes, and means for operating said mechanisms.

5. In a box machine, the combination with means for feeding the material longitudinally of the machine, of scoring mechanism, longitudinal slitting mechanism, mechanism for punching out pieces from the flaps, and pasting mechanism, means for adjusting said mechanisms relatively to each other longitudinally of the machine, and means for operating said mechanisms.

6. In a box machine, the combination with means for feeding the material longitudinally of the machine, of scoring mechanism, longitudinal slitting mechanism, mechanism for punching out pieces from the flaps, and pasting mechanism, means for adjusting the elements of said mechanism crosswise of the machine for boxes of different sizes, means for adjusting said mechanisms relatively to each other longitudinally of the machine, and means for operating said mechanisms.

7. In a box machine, the combination with means for feeding the material longitudinally of the machine, of scoring mechanism, longitudinal slitting mechanism, mechanism for punching out pieces from the flaps, and pasting mechanism, means for adjusting the elements of said mechanism crosswise of the machine for boxes of different sizes, means for adjusting the elements of each mechanism longitudinally of the machine, and means for operating said mechanisms.

8. In a box machine, the combination with means for feeding the material longitudinally of the machine, of scoring mechanism, longitudinal slitting mechanism, mechanism for punching out pieces from the flaps, and pasting mechanism, means for adjusting the elements of said mechanism crosswise of the machine for boxes of different sizes, means for adjusting the elements of each mechanism longitudinally of the machine, means for adjusting said mechanisms relatively to each other, and means for operating said mechanisms.

9. In a box machine, the combination with means for feeding the material longitudinally of the machine, of scoring mechanism, dieing mechanism, pasting mechanism and cut off mechanism, means for adjusting elements of said scoring, dieing and pasting mechanisms longitudinally of the machine for boxes of different sizes, means for adjusting the positions of each of said scoring, dieing and pasting mechanisms longitudinally of the machine, and means for operating said mechanisms.

10. In a box machine, the combination with means for feeding the material longitudinally of the machine, of scoring mechanism, dieing mechanism, pasting mechanism and cut off mechanism, means for adjusting elements of said scoring, dieing and pasting mechanisms crosswise of the machine, means for adjusting the positions of each of said mechanisms longitudinally of the machine, and means for operating said mechanisms.

11. In a box machine, the combination with means for feeding the material longitudinally of the machine, of scoring mechanism, dieing mechanism, pasting mechanism and cutoff mechanism, means for adjusting elements of said scoring, dieing and pasting mechanisms crosswise of the machine, means for adjusting the elements of said last mentioned mechanisms longitudinally of the machine, means for adjusting the positions of each of said scoring, dieing, and pasting mechanisms longitudinally of the machine, and means for operating said mechanisms.

12. In a box machine, the combination with means for feeding the material longitudinally of the machine, of scoring mechanism, dieing mechanism, pasting mechanism, cutoff mechanism and forming mechanism arranged to operate on said material, means for adjusting elements of said mechanisms longitudinally of the machine for boxes of different sizes, and means for adjusting said scoring, dieing, pasting and cutoff mechanisms toward and from said forming mechanism.

13. In a box machine, the combination with means for feeding the material longitudinally of the machine, of scoring mechanism, dieing mechanism, pasting mechanism, cutoff mechanism and forming mechanism arranged to operate on said material, means for adjusting elements of said mechanisms crosswise of the machine, means for adjusting elements of said mechanism longitudinally of the machine, so as to adjust said mechanisms to boxes of different sizes, and means for adjusting said scoring, dieing, pasting and cutoff mechanisms toward and from said forming mechanism.

14. In a box machine, the combination with means for feeding the material, of scoring mechanism, slitting mechanism, mechanism for punching pieces out of the flaps, pasting mechanism, cutoff mechanism and forming mechanism arranged to operate on said material, means for adjusting the elements of said mechanism longitudinally of the machine for boxes of different sizes, and means for adjusting said mechanisms relatively to each other.

15. In a box machine, the combination with means for feeding the material, of scoring mechanism, slitting mechanism, mechanism for punching pieces out of the flaps, pasting mechanism, cutoff mechanism and forming mechanism arranged to operate on said material, means for adjusting the elements of said scoring, slitting, punching, pasting and forming mechanisms crosswise of the machine, means for adjusting the elements of said mechanism longitudinally of the machine to boxes of different sizes, and means for adjusting said mechanisms relatively to each other.

16. In a box machine, the combination with means for feeding the material longitudinally of the machine, of scoring mechanism, dieing mechanism, pasting mechanism, cutoff mechanism, forming mechanism, and presser mechanism arranged to operate on said material, said forming mechanism being in a fixed position longitudinally of the machine, and said presser mechanism having a fixed abutment, and means for adjusting said scoring, dieing, pasting, cutoff and presser mechanisms toward and from said abutment.

17. In a box machine, the combination with means for feeding the material longitudinally of the machine, of scoring mechanism, dieing mechanism, pasting mechanism, cutoff mechanism, forming mechanism, and presser mechanism arranged to operate on said material, means for relatively adjusting the elements of said mechanisms longitudinally of the machine to boxes of different sizes, and means for adjusting said scoring, dieing, pasting, cutoff and presser mechanisms toward and from said forming mechanism.

18. In a box machine, the combination with means for feeding the material longitudinally of the machine, of scoring mechanism, dieing mechanism, pasting mechanism, cutoff mechanism, forming mechanism, and presser mechanism arranged to operate on said material, means for adjusting the elements of some of said mechanisms crosswise of the machine, means for adjusting the elements of said mechanisms longitudinally of the machine to boxes of different sizes, and means for adjusting said scoring, dieing, pasting, cutoff and presser mechanisms toward and from said forming mechanism.

19. In a box machine, the combination with means for feeding the material longitudinally of the machine, of scoring mechanism, dieing mechanism, pasting mechanism, cutoff mechanism, forming mechanism, and presser mechanism arranged to operate on said material, said forming mechanism being in a fixed position longitudinally of the machine, and said presser mechanism having a fixed abutment, means for adjusting the elements of said mechanisms longitudinally of the machine to boxes of different sizes, and means for adjusting said scoring, dieing, pasting, cutoff and presser mechanisms toward and from said abutment.

20. In a box machine, the combination with means for feeding the material longitudinally of the machine, of scoring mechanism, dieing mechanism, pasting mechanism, cutoff mechanism, forming mechanism, and presser mechanism arranged to operate on said material, said forming mechanism being in a fixed position longitudinally of the machine, and said presser mechanism having a fixed abutment, means for adjusting the elements of some of said mechanisms crosswise of the machine, means for adjusting the elements of said mechanisms longitudinally of the machine to boxes of different sizes, and means for adjusting said scoring, dieing, pasting, cutoff and presser mechanisms toward and from said abutment.

21. In a box machine, the combination with means for feeding the material longitudinally of the machine, of scoring mechanism, dieing mechanism, pasting mechanism, cutoff mechanism and forming mechanism arranged to operate on said material, one of said mechanisms being in a fixed position longitudinally of the machine, and means for relatively adjusting the parts of the other mechanisms which operate on the paper, crosswise of the machine, and toward and from said fixed mechanism.

22. In a box machine, the combination with means for feeding the material longitudinally of the machine, of scoring mechanism, dieing mechanism, pasting mechanism and forming mechanism arranged to operate on said material, one of said mechanisms being in a fixed position longitudinally of the machine, and means for relatively adjusting the parts of the other mechanisms which operate on the paper, crosswise of the machine, and toward and from said fixed mechanism.

23. In a box machine, the combination with means for feeding the material longitudinally of the machine, of scoring mechanism, dieing mechanism, pasting mechanism and forming mechanism arranged to operate on said material, one of said mechanisms being in a fixed position longitudinally of the machine, means for adjusting the other mechanisms toward and from said fixed mechanism, and means for adjusting the elements of said mechanisms crosswise of the machine.

24. In a box machine, the combination with means for feeding the material longitudinally of the machine, of scoring mechanism, dieing mechanism, pasting mechanism and forming mechanism arranged to operate on said material, one of said mechanisms being in a fixed position longitudinally of the machine, means for adjusting the other mechanisms toward and from said fixed mechanism, and means for adjusting the elements of said mechanisms longitudinally of the machine, so as to adjust said mechanisms to boxes of different sizes.

25. In a box machine, the combination with means for feeding the material longitudinally of the machine, of scoring mechanism, dieing mechanism, pasting mechanism and forming mechanism arranged to operate on said material, one of said mechanisms being in a fixed position longitudinally of the machine, means for adjusting the other mechanisms toward and from said fixed mechanism, means for adjusting the elements of said mechanisms crosswise of the machine, and means for adjusting the elements of said mechanisms longitudinally of the machine, so as to adjust said mechanisms to boxes of different sizes.

In testimony whereof I affix my signature in presence of two witnesses.

HARRY A. INMAN.

Witnesses:
  CHAS. H. INMAN,
  THOMAS A. HENNESSEY.